May 8, 1956 J. R. MARSHALL 2,745,066
COUPLING TRANSFORMER WITH ALTERNATE SIGNAL SOURCE
Filed Dec. 21, 1950
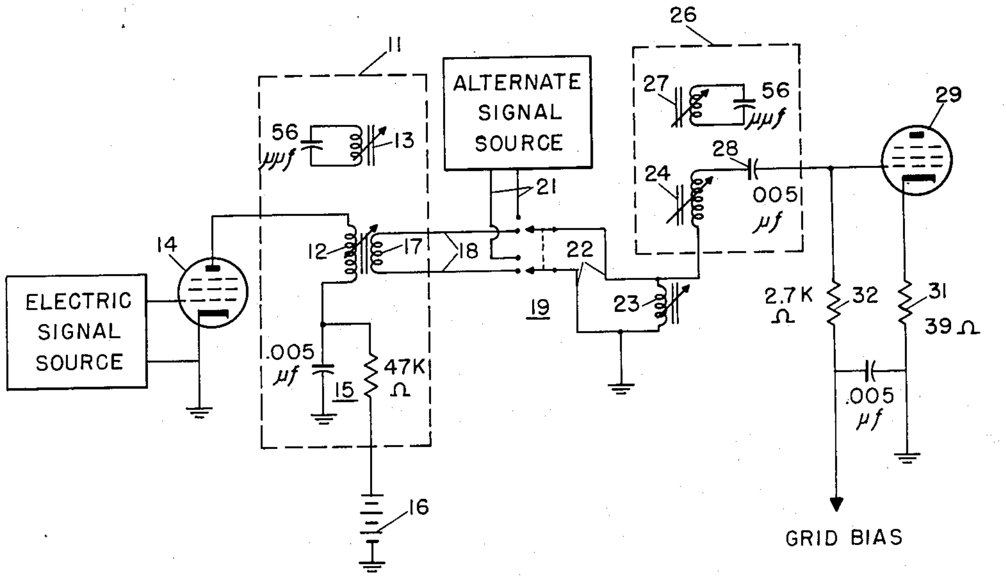
INVENTOR.
JAMES R. MARSHALL
BY Darby & Darby
ATTORNEYS

United States Patent Office 2,745,066

Patented May 8, 1956

2,745,066

COUPLING TRANSFORMER WITH ALTERNATE SIGNAL SOURCE

James R. Marshall, Englewood, N. J., assignor to Allen B. Du Mont Laboratories, Inc., Clifton, N. J., a corporation of Delaware Application December 21, 1950, Serial No. 201,895

3 Claims. (Cl. 333—7)

This invention relates to inter-stage coupling transformers for amplifiers of electric waves, and more particularly to intermediate frequency transformers as used in television receivers.

It is desirable, in television receivers, to employ intermediate frequency coupling transformers characterized by the ability to pass relatively large band-widths of frequencies, and at the same time to reject adjacent undesired signals.

An object of this invention is to provide an intermediate frequency transformer having improved rejection of undesired signals.

A further object is to provide an adjustable band-width transformer having primary and secondary windings which may be positioned remotely from each other.

Another object is to provide a transformer that is designed to be switched to alternate signal input sources.

Other objects will be apparent from the description and drawings in which the single figure is a circuit diagram of the improved transformer, and associated circuits in a television receiver intermediate frequency stage for video or combined audio and video signals.

A primary circuit 11 of the improved transformer contains a primary adjustable inductance 12 and a first tunable trap 13. An end of the primary inductance 12 is connected to an output electrode of a preceding tube 14 which may be an amplifier tube or a mixer or converter. The input electrode of the tube 14 is connected to a source of electric signals. The remaining end of the primary inductance 12 is connected to a filter 15 which is connected to a source of voltage 16. A coupling coil 17 is positioned in relationship to the primary inductance 12.

A first coupling line 18 connects the coupling coil 17 to a selector switch 19. A second coupling line 21 connects an alternate signal source to the selector switch 19. A third coupling line 22 connects the switch 19 to a band-width adjusting inductance 23 having one end connected to ground and the remaining end connected to a secondary inductance 24 contained in a secondary circuit 26 of the improved transformer together wtih a second tunable trap 27. The remaining end of the secondary inductance 24 is connected through a coupling condenser 28 to an input electrode of a tube 29 which may be an amplifier tube having a cathode-bias resistor 31 and a grid leak resistor 32.

The primary inductance 12 is tuned to the desired frequency band and acts as an output load impedance for the tube 14. The first trap 13 adjacent the primary inductance and inductively coupled thereto, is tuned to attenuate certain undesired frequencies such as the adjacent sound carrier or the adjacent video carrier.

The coupling coil 17 is preferably tightly coupled to the primary inductance 12. The coupling lines may be coaxial cable, or twisted or parallel wires.

The selector switch 19 is arranged to connect the third coupling line 22 to alternate input sources such as, for example, a signal source comprising a television receiver input circuit for the present standard television channels, and an alternate signal source comprising an input circuit for U. H. F. television channels. The coupling lines are preferably low impedance, low loss types so that the selector switch 19 will not introduce appreciable losses at the frequencies involved. The band-width adjusting inductance 23 in shunt with the third coupling line 22, is adjusted to obtain the desired band-width response of the transformer. The secondary inductance 24 is preferably tuned to the same frequency band as is the primary inductance 12.

The second trap 27 adjacent the secondary 24 and inductively coupled thereto, may be tuned to the same frequency as is the first trap 13, thereby obtaining increased attenuation at that frequency, or it may be tuned to a different frequency. For example, in a television receiver one of said traps may be tuned to attenuate adjacent channel sound signals and the other trap may be tuned to attenuate adjacent channel video signals. Alternatively, the two traps may be tuned to frequencies slightly different from each other and from the frequency to be attenuated, thereby obtaining a broader attenuation characteristic than is obtainable from a single trap. Because of the additional attenuation provided by the use of two traps, it is sometimes feasible to employ traps of a less expensive, lower Q type than would be necessary if only a single trap were employed.

By isolating the traps from each other as described, two traps may be incorporated in one transformer and may be tuned without deleterious interaction effects. Preferably, the primary circuit 11 and the secondary circuit 26 are individually shielded as indicated by the dotted line enclosures in the drawing.

Although the described embodiment pertains to intermediate frequency amplifiers in television receivers, the invention may be applicable to other uses where its features are desired. The true scope of the invention is defined by the following claims.

What is claimed is:

1. An electric wave coupling circuit comprising a primary winding connected to an electric signal source, a low impedance coupling line connected to said primary winding, a switch connected to said coupling line, an alternate signal source connected to said switch, a secondary winding magnetically isolated from said primary winding and connected to said switch, and a magnetically isolated inductance connected in shunt with said secondary winding between said secondary winding and said switch, said switch selectively connecting said primary circuit or said alternate signal source to said secondary winding.

2. The coupling circuit of claim 1, comprising a first trap coupled to said primary winding and a second trap coupled to said secondary winding, said traps being magnetically isolated from each other.

3. In a television receiver, a signal circuit comprising a transformer having a primary circuit and a secondary circuit magnetically isolated from each other, a television signal source connected to said primary circuit, a switch, a first low impedance coupling line connecting said primary circuit to said switch, an alternate television signal source, a second low impedance coupling line connecting said alternate signal source to said switch, a third low impedance coupling line connecting said switch to said secondary circuit, a magnetically isolated inductance connected in shunt with said third coupling line and first and second tuned circuits adjacent and respectively inductively coupled to said primary and secondary circuits said switch being connected to connect selectively said first coupling line or said second coupling line to said third coupling line.

References Cited in the file of this patent

UNITED STATES PATENTS

| | | |
|---|---|---|
| 1,556,129 | Round | Oct. 6, 1925 |
| 1,687,062 | De Bellescize | Oct. 9, 1928 |
| 1,997,224 | McClure | Apr. 9, 1935 |
| 2,020,813 | Van Slooten | Nov. 12, 1935 |
| 2,111,397 | Holmes | Mar. 15, 1938 |
| 2,115,655 | Thompson | Apr. 26, 1938 |
| 2,259,595 | Vreeland | Oct. 21, 1941 |
| 2,587,667 | Toth | Mar. 4, 1952 |
| 2,606,250 | Mackey | Aug. 5, 1952 |
| 2,644,927 | Dishal et al. | July 7, 1953 |

FOREIGN PATENTS

| | | |
|---|---|---|
| 516,149 | Great Britain | Jan. 26, 1939 |
| 848,304 | France | July 24, 1939 |